Feb. 7, 1967     B. D. McINTYRE     3,302,756
SHOCK ABSORBER
Filed Nov. 27, 1964
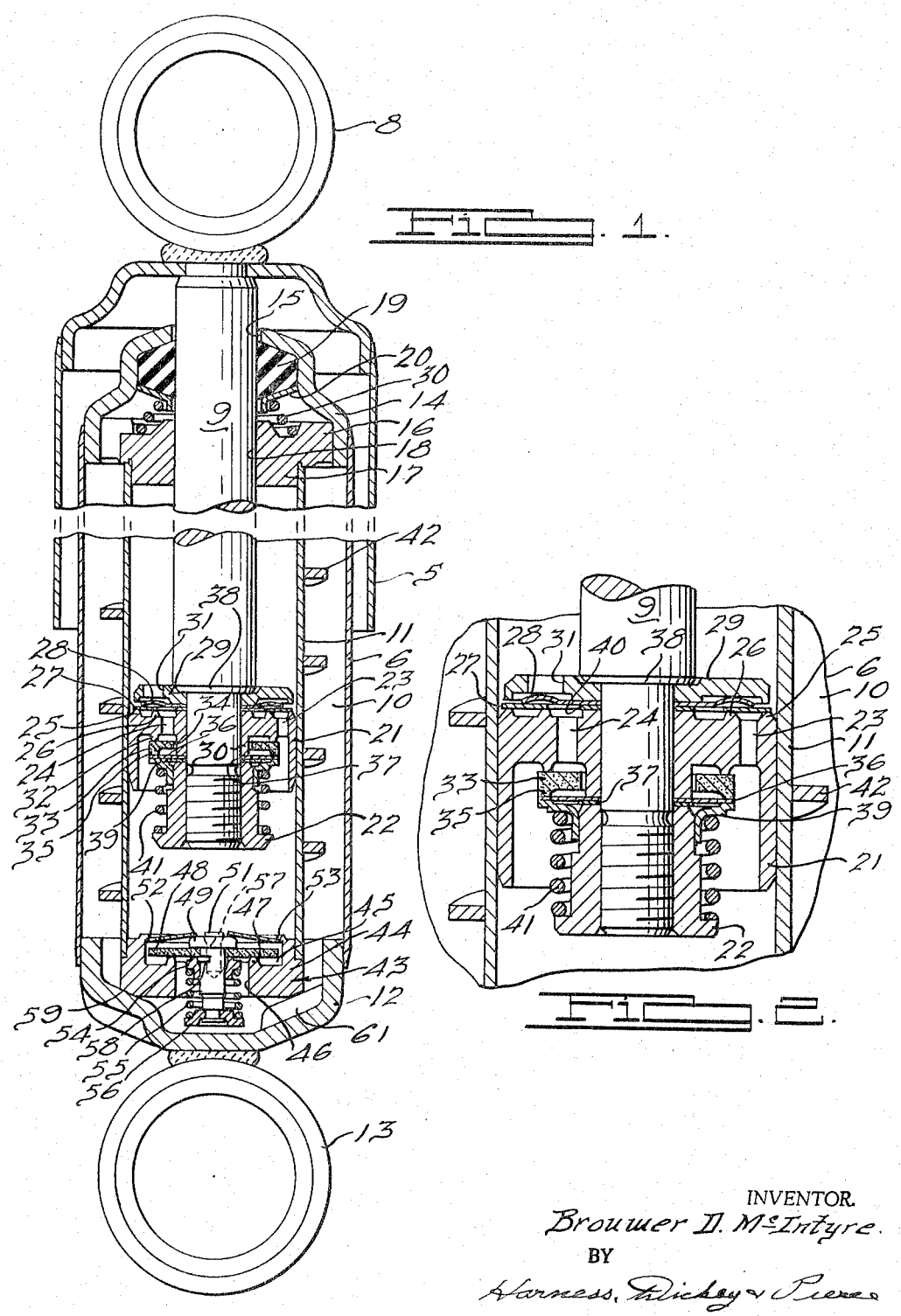
INVENTOR.
Brouwer D. McIntyre
BY Harness, Dickey & Pierce
ATTORNEYS.

United States Patent Office 3,302,756
Patented Feb. 7, 1967

3,302,756
SHOCK ABSORBER
Brouwer D. McIntyre, Monroe, Mich., assignor to Monroe Auto Equipment Company, a corporation of Michigan
Filed Nov. 27, 1964, Ser. No. 414,198
1 Claim. (Cl. 188—88)

This invention relates to hydraulic, direct acting shock absorbers, and particularly to a shock absorber having valve plates which are pervious to the passage of oil or other fluid therethrough.

Shock absorbers for automotive vehicles, and the like, have had minute passageways in the valve seats for the bleeding of fluid when very little action occurs on the piston within the pressure cylinder. While such minute passageways function satisfactorily, they are objectionable in certain applications because of the swishing and hydraulic impingement noises which were produced by the movement of the oil therethrough. In practicing the present invention, the objectionable swishing and impingment noises were eliminated by the use of valve plates made of porous material which controls the bleeding of the fluid by permitting the fluid to pass through the pores of the valve plate. The valve plates are preferably made of porous sintered metal having a porosity which may vary depending on the type of shock absorber in which it is employed. By using the porous valve plates, the swishing and hydraulic impinging noises are eliminated.

Accordingly, the main objects of the invention are: to provide a shock absorber in which the valve plates are made of porous material to permit fluid to bleed therethrough; to eliminate the swishing and hydraulic impinging sounds occurring at the bleed orifices of the shock absorber valves by employing valve plates having a proper degree of porosity; to provide valve plates of porous material which permits the passage of fluid therethrough when variable pressures occur on the fluid during the limited movement of the piston of the shock absorber, and in general to provide a shock absorber with bleed passageways for the fluid which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a sectional view of a shock absorber having porous valve plates embodying features of the present invention, and FIG. 2 is an enlarged broken sectional view of the structure illustrated in FIG. 1.

The shock absorber illustrated in the drawing is of the standard type except for the addition of the porous valve plates which permits the bleeding of the fluid at the time pressure occurs thereon while the valve plates remain seated. The shock absorber is provided with telescoping tubular sections 5 and 6 which are movable longitudinally with respect to each other when the shock absorber is attached between the sprung and unsprung portion of a vehicle or the like. The tubular section 5 has an end cap 7 secured to the upper end thereof on which a ring-like attaching element 8 is secured. A piston rod 9 has its upper end rigidly connected to the underside of the central portion of the cap 7 and depends therefrom into the cylindrical section 6 which is concentric with section 5. A fluid reservoir 10 is formed outwardly of a pressure cylinder 11, which is concentric to the cylinder 6. The lower end of the tubular section 6 is closed by a cap 12, which is adapted to be connected to the unsprung portion of a vehicle by any suitable means, such as by a ring-like attaching member 13. The upper end of the tubular section 6 is closed by a cap 14 which is provided with a central aperture 15 through which the piston rod 9 extends.

The upper end of the pressure cylinder 11 is closed by a piston rod guide member 16, which has a reduced portion 17 extending within the pressure cylinder 11 and is secured in sealed relation thereto. The guide member 16 has a central aperture 18 which snugly fits the piston rod 9 as it operates therethrough. A rubber seal 19 surrounds the piston rod 9 and is confined within the upper portion of the end cap 14 by a retainer element 20 and a spring 30. A piston 21 is mounted on the lower shoulder end of the piston rod 9, secured thereon by a nut 22. The piston 21 has an outer set of annularly disposed apertures 23 extending therethrough and another set of annularly disposed apertures 24 located inwardly of the apertures 23. Annular valve seats 25 and 26 are provided on the top of the piston 21 engaged by a thin washer-like valve 27 for closing the passageways 23 when the piston 9 is moved upwardly. A spring disc 28 urges the washer valve 27 upon the annular seats 25 and 26.

A washer 29 having a plurality of apertures 31 therethrough, is disposed above the spring disc 28 against the shoulder 38 of the piston rod 9. An annular valve seat 32 is disposed on the bottom of the piston 21 outwardly of the inner row of apertures 24, in engagement with a porous valve plate 33 having an aperture 34 spaced from the sleeve-like extension 30 at the center of the piston 21. The valve plate 33 has a peripheral downwardly extending flange 35 disposed in engagement with a thin washer 36 which rests upon a washer 37, all of which is clamped tightly by the nut 22 against the shoulder 38 on the piston rod 9. A sleeve 39 is urged upwardly against the thin washer 36 by a spring carried by the nut 22. When oil or other fluid under pressure moves downwardly through the apertures 24, the valve plate 33 is urged downwardly along with the washer 36 and disc 39 against the tension of the spring 41 to permit the oil or fluid to pass into the area below the piston as it is moved upwardly by the rod 9. A helical baffle 42 is secured to the outer surface of the pressure cylinder 11 within the reservoir 10 for reducing the turbulence of the oil or other fluid as it moves into and out of the reservoir.

The lower end of the pressure cylinder 11 has a compression valve assembly 43 which consists of a head 44 having a portion extending within the end of the cylinder 11 in secured relation thereto. The head 44 has an enlarged recess 45 communicating with a central aperture 46 at the upper edge of which an annular valve seat 47 is provided. A porous valve plate 48 rests upon the seat 47 and is secured to a central rivet 49, which is urged downwardly by spring fingers 51 of a disc 52 which is secured in position by a coined edge 53 at the upper edge of the recess 45. The rivet has a slidable sleeve 54 urged upwardly thereon by a spring 55 against the underside of the valve plate 48. The bottom end of the spring is supported by a washer 56, secured to the lower end of the rivet. The rivet has a central passageway 57 communicating with an outlet slot 58 which delivers oil or other fluid to within the sleeve 54 which is moved downwardly against the tension of the spring 55 to permit the oil or other fluid to pass from the lower end of the cylinder through the passageway 46 into the reservoir 10. The head 43 has notches 59 therein engaged by a plurality of embossed areas 61 in the cap 12 to secure the head in fixed relation therewith.

The shock absorber functions in the usual manner, the upward movement of the piston directing the fluid through the orifices 24 thereof past the valve plate 33 into the lower portion of the pressure cylinder 11. When oil or other fluid is required to fill the area below the piston because of the differential in volume of the cylinder 11 above and below the piston due to the location of the piston rod 9 above the piston, the valve plate 48 will open and permit the fluid to be drawn from the reservoir and thereby maintain the cylinder full of fluid at all times. Upon the downward movement of the piston rod 9, the fluid in the lower portion of the cylinder will pass upward through the outer annular row of apertures 23 past the valve 27 into the upper portion of the pressure cylinder. Because of the presence of the piston rod 9 within the upper portion of the cylinder, pressure will build up in the lower portion as the piston moves downwardly. When this occurs, the oil or other fluid below the piston will pass through the aperture 57 in the rivet 49 and out through the slot 58 to force the sleeve 54 to move downwardly against the pressure of the spring 55 and thereby permit the fluid to pass into the aperture 46 and the reservoir 10. Such shock absorber operations are well known and will not be described further in detail.

Heretofore the annular valve seats 32 and 47 had minute notches coined therein to permit the bleeding of the oil or other fluid therethrough when only light forces occurred thereon during the limited operation of the shock absorber. This produced objectionable swishing and hydraulic impingement noises and to overcome these objectionable noises, the valve plates 33 and 48 of the present invention are employed. The valve plates are made of sintered material so as to be porous to permit the bleeding of the oil or other fluid therethrough over the entire area thereof and thereby eliminating the localized movement of the oil under pressure fluid through the small notches which produce the undesirable noises. The porosity of the plates will vary for different types of shock absorbers, the only requirement is that sufficient porosity be present to permit the bleeding of the oil or other fluid therethrough at a desirable rate when under pressure at the time the piston is not moved sufficiently to produce the normal operation of the shock absorber.

What is claimed is:

In a shock absorber, a piston, a cylinder for said piston including a head, said head having a valve seat, a reservoir, and a valve disc between the reservoir and said cylinder movable to and from said seat, said valve disc being made of a porous metal.

References Cited by the Examiner
UNITED STATES PATENTS

| | | | |
|---|---|---|---|
| 2,190,842 | 2/1940 | Kuhn | 188—96 X |
| 2,500,708 | 3/1950 | Rossman | 188—96 X |
| 2,702,398 | 2/1955 | Marcus | 188—96 X |
| 2,853,159 | 9/1958 | Kuhn | 137—513.3 X |

FOREIGN PATENTS 204,845  12/1956  Australia.

MILTON BUCHLER, *Primary Examiner.*
FERGUS S. MIDDLETON, *Examiner.*
G. E. A. HALVOSA, *Assistant Examiner.*